United States Patent
Xu et al.

(10) Patent No.: US 9,578,015 B2
(45) Date of Patent: Feb. 21, 2017

(54) STEP-UP AUTHENTICATION FOR SINGLE SIGN-ON

(71) Applicant: VMware, Inc., Palo Alto, CA (US)

(72) Inventors: Emily Hong Xu, Palo Alto, CA (US); Shraddha Ladda, Sunnyvale, CA (US); Dale Robert Olds, Redwood City, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/530,064

(22) Filed: Oct. 31, 2014

(65) Prior Publication Data
US 2016/0127352 A1    May 5, 2016

(51) Int. Cl.
*H04L 29/00* (2006.01)
*H04L 29/06* (2006.01)
*H04L 9/32* (2006.01)
*G06F 21/31* (2013.01)
*H04W 12/06* (2009.01)
*G06F 21/62* (2013.01)
*H04W 12/00* (2009.01)

(52) U.S. Cl.
CPC .......... *H04L 63/0815* (2013.01); *G06F 21/31* (2013.01); *H04L 9/32* (2013.01); *H04L 9/3213* (2013.01); *H04L 63/0807* (2013.01); *H04L 63/105* (2013.01); *H04W 12/06* (2013.01); *G06F 21/62* (2013.01); *H04W 12/00* (2013.01)

(58) Field of Classification Search
CPC ............ H04L 9/32; H04L 63/08; H04L 63/10; H04L 2463/082; G06F 21/03; G06F 21/62; G06F 2211/003
USPC ........ 726/1–10, 16–21, 26–30; 713/168–175, 713/182–186; 709/217–229
See application file for complete search history.

(56) References Cited

U.S. PATENT DOCUMENTS

| | | | | |
|---|---|---|---|---|
| 6,668,322 | B1 * | 12/2003 | Wood | G06F 21/41 713/182 |
| 7,500,262 | B1 * | 3/2009 | Sanin | G06F 21/41 705/67 |
| 9,038,138 | B2 * | 5/2015 | Trammel | H04L 9/3213 713/187 |
| 2005/0188225 | A1 * | 8/2005 | Ikenoya | H04L 63/0807 726/5 |
| 2007/0136794 | A1 * | 6/2007 | Chin | H04L 63/08 726/5 |
| 2009/0249448 | A1 | 10/2009 | Choi et al. | |
| 2012/0102551 | A1 | 4/2012 | Bidare | |
| 2012/0227095 | A1 | 9/2012 | Wood et al. | |

(Continued)

OTHER PUBLICATIONS

International Search Report issued Mar. 2, 2016, for PCT/US2015/057821.

*Primary Examiner* — Madhuri Herzog

(57) ABSTRACT

A method for authenticating a user seeking access to first and second resources that have different authentication levels. The method includes receiving a primary token that is associated with a first authentication event of the user and authenticates the user to access the first resource, and receiving a first request to access the second resource. The method further includes receiving first credentials of the user. The method further includes, responsive to validating the first credentials, generating a second authentication event, associating the second authentication event with the primary token, and issuing a first secondary token that authenticates the user to access the second resource.

20 Claims, 4 Drawing Sheets

(56) References Cited

U.S. PATENT DOCUMENTS

2014/0082715 A1* 3/2014 Grajek .............. G06F 17/30876
    726/8
2014/0143149 A1 5/2014 Aissi
2014/0273965 A1 9/2014 Raleigh et al.
2015/0020158 A1* 1/2015 Kruglick ............. H04L 63/0853
    726/3
2015/0229636 A1* 8/2015 Scavo .................... H04L 29/06
    726/8

* cited by examiner

STEP-UP AUTHENTICATION FOR SINGLE SIGN-ON

BACKGROUND

Modern computing systems provide various methods for user authentication. Some authentication methods include a password requirement, where the user enters his or her user identifier as well as a secret password. This is referred to as single-factor authentication. More secure authentication regimes, such as multiple-factor authentication, require, in addition to a password, a second means of verification, such as a token, smartcard, fingerprint, retinal scan, etc. For example, with smartcard authentication, a user inserts a smartcard into a smartcard reader and enters a personal identification number (PIN). When a correct PIN is entered, one or more certificates that are stored in the smartcard are used to authenticate the user.

In computing systems that access remote resources, a user may need to be authenticated each time the remote resources are accessed, requiring the user to repeatedly enter his or her credentials. As a result, for user convenience, a feature referred to as single sign-on (SSO) may be used to reduce the burden on the user by enabling user credentials to be shared between and reused by multiple applications. For example, a web browser that uses SSO may rely on a JSON Web Token (JWT) that identifies the user and stores an authentication event. The JWT can then be stored in a browser cookie for subsequent use by other applications that require a similar type of authentication. That is, a request to the authentication service on behalf of other applications executed within the same browser may include the browser cookie, enabling the authentication service to validate the JWT and verify that the user has already authenticated.

In enterprise applications, SSO is an increasingly popular feature due to trends such as Bring Your Own Device (BYOD) and Corporate-Owned Personally Enabled (COPE) devices. For example, enterprise administrators may require enforcement of specific authentication policies when a user accesses sensitive resources, such as payroll, banking, and health care. Consequently, SSO provides a convenient way for a user to enter his or her credentials once and reuse the stored credentials to access various types of sensitive resources.

However, because native mobile applications do not store tokens in a browser, the native applications cannot share authentication information in a cookie associated with a shared authentication service. Accordingly, one common mobile SSO approach is token sharing. Token sharing occurs when one native application obtains a token from an authentication service (AS) and then shares that token with other mobile applications. Because the token is shared, the token works only in the situation where all applications are owned by one enterprise resource server. Additionally, because the AS does not know which application submitted the token to access the resource server, the AS cannot revoke the token to prevent only that application from accessing resources, since doing so would block all applications.

Further, in some circumstances, even if the user has already been authenticated to the SSO system, accessing sensitive resources may require further authentication via a more secure authentication method, commonly referred to as step-up authentication. As a result, the user is still required to enter his or her credentials each time authentication via the more secure method is requested by an application. Moreover, after the user has provided his or her credentials to perform step-up authentication for a particular application, the user may have to re-enter those credentials (e.g., re-authenticate) to access a resource with that application each time the user's session expires.

Accordingly, there are challenges faced by system administrators when attempting to provide users with convenient and secure access to sensitive resources.

SUMMARY

One or more embodiments of the present disclosure provide a method for authenticating a user seeking access to first and second resources that have different authentication levels. The method includes receiving a primary token that is associated with a first authentication event of the user and authenticates the user to access the first resource, and receiving a first request to access the second resource. The method further includes receiving first credentials of the user. The method further includes, responsive to validating the first credentials, generating a second authentication event, associating the second authentication event with the primary token, and issuing a first secondary token that authenticates the user to access the second resource.

One or more embodiments of the present disclosure further provide a non-transitory computer-readable storage medium comprising instructions that, when executed in a computing device, authenticates a user seeking access to first and second resources that have different authentication levels. The non-transitory computer-readable storage medium includes instructions for receiving a primary token that is associated with a first authentication event of the user and authenticates the user to access the first resource, and receiving a first request to access the second resource. The non-transitory computer-readable storage medium further includes instructions for receiving first credentials of the user. The non-transitory computer-readable storage medium further includes instructions for, responsive to validating the first credentials, generating a second authentication event, associating the second authentication event with the primary token, and issuing a first secondary token that authenticates the user to access the second resource.

One or more embodiments of the present disclosure further provide a computer system for authenticating a user seeking access to first and second resources that have different authentication levels. The computer system includes a memory and a processor programmed to carry out the step of receiving, from a token agent, a primary token that is associated with a first authentication event of the user and authenticates the user to access the first resource, and receiving a first request associated with a first application to access the second resource. The memory and the processor are further programmed to carry out the steps of receiving first credentials of the user, and, responsive to validating the first credentials, generating a second authentication event, associating the second authentication event with the primary token, and issuing, to the token agent, a first secondary token that authenticates the user to access the second resource.

DETAILED DESCRIPTION

Figure 1:
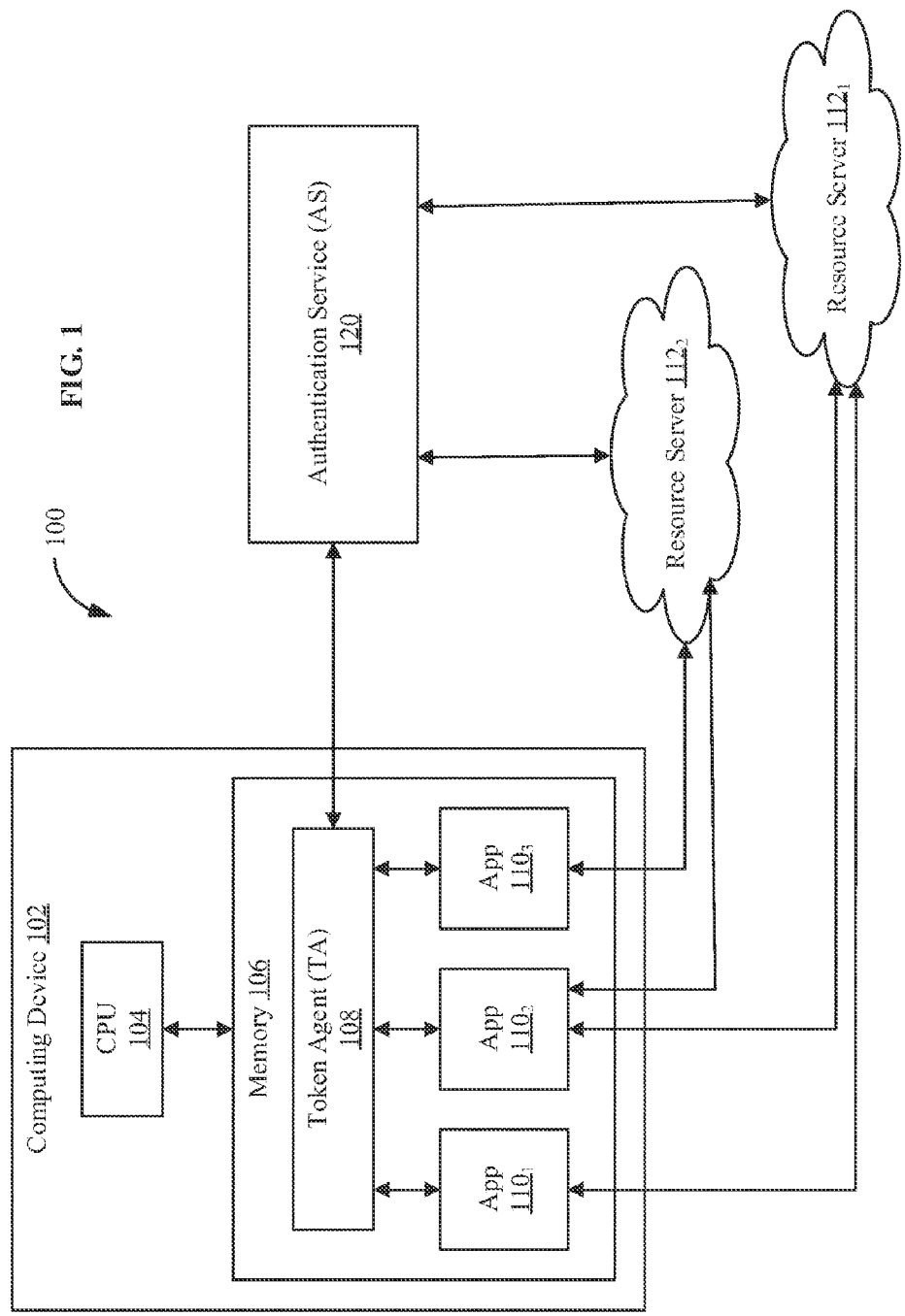
FIG. 1 illustrates a system configured to implement one or more aspects of various embodiments.

FIG. 1 illustrates a system 100 configured to implement one or more aspects of various embodiments. As shown, the system 100 includes, without limitation, a computing device 102, an authentication service (AS) 120, and one or more resource servers 112 (e.g., resource server $112_1$ and resource server $112_2$). Computing device 102 includes, without limitation, a central processing unit (CPU) 104 and a memory 106. Memory 106 is configured to store a token agent (TA) 108 and software application(s) 110 (e.g., application $110_1$, application $110_2$, and application $110_3$). CPU 104 is configured to execute token agent 108 and software application(s) 110.

Computing device 102 may be any type of electronic device that enables a user to connect to (e.g., via the Internet, a local area network (LAN), an ad hoc network, etc.) and communicate with authentication service 120, resource server(s) 112, and/or one or more other users. Exemplary electronic devices include, without limitation, desktop computing devices, portable or hand-held computing devices, laptops, tablets, smartphones, mobile phones, personal digital assistants (PDAs), etc. Software application(s) 110 may be any type of software application. However, in the exemplary embodiment described herein, software application(s) 110 include native mobile applications that are configured to be executed within a mobile operating system on a mobile device, such as a smartphone. Native mobile applications are generally tied to one type of mobile operating system and are coded in a specific programming language (e.g., Objective C for iOS and Java for Android operating systems). A user of the native mobile applications may issue commands to computing device 102, for example, in order to access resources stored on one or more resource servers 112.

Authentication service 120 may be offered by an authentication server and include a directory of users and may store user credentials and/or access policies associated with the users. In one embodiment, the authentication service 120 is external to and independent from the computing device 102. For example, the authentication service 120 may be connected to multiple computing devices to provide authentication service. Access policies stored by authentication service 120 (e.g., via Active Directory) may be used to track user permissions, such as whether certain users or groups of users are authorized to access various types of resources, as well as the authentication method(s) required before access to such resources can be granted. Authentication service 120 may further store other types of information associated with user authentication, such as when authentication events occurred (e.g., a timestamp), which authentication method(s) were used, which token(s) are associated with particular users, which tokens have been issued by authentication service 120, and the like.

Token agent 108 may be an application on the computing device 102 configured to acquire, store, and transmit authentication tokens that are used to electronically verify the identity of a user of computing device 102. More specifically, token agent 108 may be configured to collect and securely transmit user credentials (e.g., a username/password, smartcard, SecurID, PIN, etc.) to authentication service 120 for validation. In response, after validating the user credentials (e.g., via Active Directory or similar service), authentication service 120 may issue one or more tokens to token agent 108. In some embodiments, communications between token agent 108 and authentication service 120 are performed via a representational state transfer (REST) API.

In various embodiments, token agent 108 may initially request a user to input user credentials to enable token agent 108 to log in and obtain a primary token. The primary token may be stored in a local memory of the token agent 108. Token agent 108 may then use the primary token to obtain secondary tokens for application(s) 110 running on computing device 102. The secondary tokens acquired by token agent 108 may then be stored and/or passed to application(s) 110, which use the secondary tokens to obtain access to one or more resources stored on resource server(s) 112. For example, application $110_1$ may receive a secondary token from token agent 108 and transmit the secondary token to resource server $112_1$. Resource server $112_1$ may validate the secondary token by transmitting the secondary token to authentication service 120. Additionally or alternatively, resource server $112_1$ may validate the secondary token locally, for example, based on a trust relationship previously established with application $110_1$. If resource server $112_1$ successfully validates the secondary token, resource server $112_1$ then grants application $110_1$ access to the requested resource(s). In some embodiments, token agent 108 issues each native application a different secondary token. Accordingly, in such embodiments, token agent 108 and/or authentication service 120 is able to revoke a specific application's 110 access to a resource without revoking access by all applications.

Although FIG. 1 shows token agent 108 as a separate software module, it is also contemplated that token agent 108 may be integrated with one or more of applications 110. When configured as a separate software module, token agent 108 may be capable of communicating with and transmitting tokens between a variety of different software applications 110.

Token agent 108 may be controlled by a user, or token agent 108 may operate as a background process. Consequently, token agent 108 may include an interface that is designed for use with conventional input devices, such as a touchscreen device, a mouse, a keyboard, and the like. When token agent 108 is controlled by the user, the user may initiate a request for a token, authorize certain applications 110 to use one or more tokens to access remote resources, and/or revoke usage of one or more tokens. Token agent 108 may further operate automatically or semi-automatically by receiving requests for resources from application(s) 110, determining (e.g., based on an access policy) whether an application 110 is authorized to access certain resources, prompting a user of computing device 102 for user credentials (when necessary), transmitting acquired tokens to one or more applications 110, and/or revoking access of one or more applications 110 to a token or remote resource.

In some embodiments, resource servers 112 include one or more application deployment environments provided by one or more cloud computing platform providers (sometimes referred to simply as "cloud providers"). For example, computing device 102 may access resources stored in a deployment environment for development, testing, staging, and production of a web application. Accordingly, each resource server 112 may include one or more host computers that are organized into one or more clusters. The host computers may include conventional components of a computing device, such as memory, a processor, a disk interface, and a network interface and may be configured to support a virtualized environment to deliver one or more application services related to information technology, including but not limited to, web services, database services, data processing services, and directory services. Authentication service 120 may be similarly configured.

As described above, native mobile applications do not store tokens in a browser. Consequently, when a user authenticates via one application, the token received by the application typically is not accessible to other applications. Additionally, current authentication solutions to obtain tokens from an authentication service require user authentication and authorization, but that user authentication is not saved for future use, preventing the authentication event from being used to subsequently obtain tokens for other applications. Thus, when step-up authentication is performed by one application, there is currently no way to preserve the user authentication information to be used for SSO by other applications. As a result, each time step-up authentication is required by a different application, current authentication solutions require the user to enter his or her credentials and submit the credentials to authentication service 120 for validation to authorize the application to access resources on their behalf.

Accordingly, in various embodiments, to enable step-up authentication to be performed via SSO, user authentication information, such as when a user authenticated and which authentication method was used, may be associated with a primary token stored by token agent 108. Then, when the primary token is presented to authentication service 120 by token agent 108, the associated user authentication information may be retrieved and used for dynamic policy evaluation. Such techniques are described below in further detail in conjunction with FIGS. 2-4.

Step-Up Authentication for Single Sign-On

Figure 2:
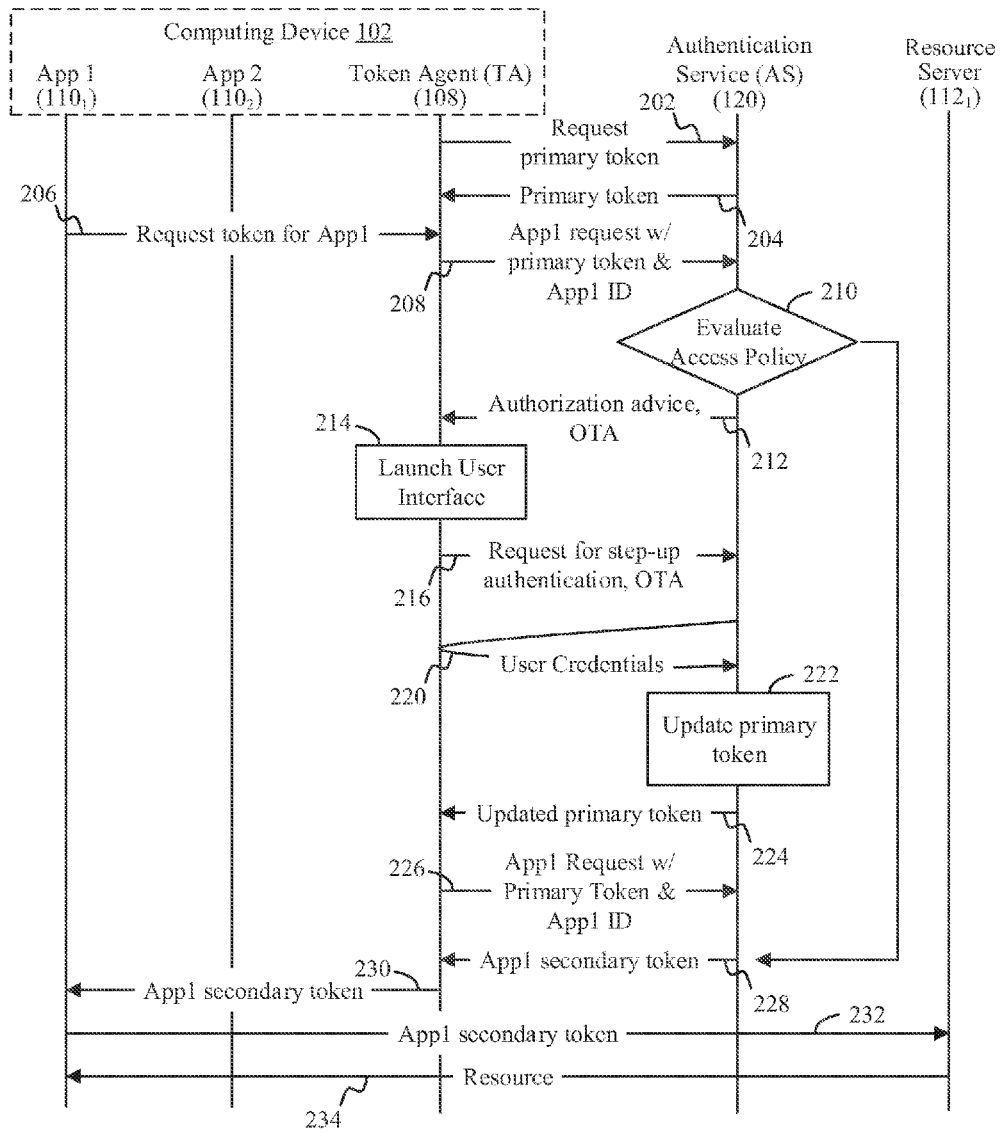
FIG. 2 is a sequence diagram that illustrates example operations for authenticating a user of computing device via authentication service, according to one embodiment.

The operations of system 100 are shown in FIG. 2. FIG. 2 is a sequence diagram that illustrates example operations for authenticating a user of computing device 102 via authentication service 120, according to one embodiment. While the example operations are depicted as being performed by the system 100 of FIG. 1, it is contemplated that embodiments may be performed by other suitable systems.

At step 202, token agent 108 requests a primary token from authentication service 120. In some embodiments, after installing token agent 108 on computing device 102, token agent 108 may request initial authentication of the user to authentication service 120. During initial authentication, token agent 108 user may pass user credentials to authentication service 120 to generate an initial authentication event. In return, at step 204, token agent 108 receives a primary token associated with the initial authentication event and stores the primary token in local memory. In some embodiments, authentication events are stored by authentication service 120 and are associated with the primary token (e.g., via a record).

In some embodiments, the primary token includes a JSON Web Token (JWT). The primary token may include an alpha-numeric string that is unique to the user (or to a group of users). Authentication service 120 may store a record associated with the alpha-numeric string in a directory. The record may include an access policy that is evaluated by authentication service 120 and indicates the types of resources that a user is authorized to access via the primary token (e.g., by using a secondary token issued by authentication service 120). The types of resources that the user is authorized to access may be based on one or more authentication methods (e.g., the initial authentication event) that have been performed by the user. In addition, the primary token may include claims, such as a username, user identification, email address, TenantID, issuer, audience, scope, authentication context (AuthContext), authentication timestamp (AuthTime), issue time, expiration time. Further, the primary token may be signed, for example, in order to detect and/or prevent unauthorized modification of the primary token, or the primary token may be unsigned.

Next, at step 206, application 110$_1$ ("App1") requests a token from token agent 108 to access resources stored on resource server 112$_1$. In response to the request from App1, at step 208, token agent 108 transmits the request for resources, the primary token, and an optional identification (ID) associated with App1 ("App1 ID") to authentication service 120. Additionally, in some embodiments, a request for resources from application 110 may include a device identification ("device ID"), which enables token agent 108 and/or authentication service 120 to track which user device (e.g., laptop computer, smartphone, desktop computer, etc.) is requesting resources and/or receiving a secondary token. At step 210, authentication service 120 reads the alpha-numeric string stored in the primary token and accesses the record associated with the primary token. Authentication service 120 then evaluates an access policy associated with the record to determine whether the user is authorized to access the resources specified in App1's request for resources.

If, at step 210, authentication service 120 determines (e.g., based on the initial authentication event) that the user is authorized to access the requested resources, then the sequence proceeds to step 228, where authentication service 120 issues a secondary token for App1 to token agent 108. Then, at step 230, token agent 108 passes the secondary token to App1. At step 232, App1 transmits the secondary token and the request for resources to resource server 112$_1$, which attempts to validate the secondary token. If resource server 112$_1$ determines that the secondary token is valid, at step 234, resource server 112$_1$ transmits the requested resources to App1.

If, however, at step 210, authentication service 120 determines that the user is not authorized to access the requested resources, then the sequence may proceed to step 212, where authentication service 120 replies to token agent 108 with App1 ID and authentication advice to re-authenticate with an additional authentication method. A one-time access (OTA) token also may be transmitted to token agent 108 along with the authentication advice.

In some embodiments, various types of resources stored in resource server(s) 112 may be associated with different authentication levels. For example, access to highly sensitive resources (e.g. payroll data) may require a higher authentication level than access to less sensitive resources (e.g., a company message board). Accordingly, if the resources requested by App1 require an authentication level that is higher than the authentication level currently associated with the primary token, then, at step 212, authentication service 120 may indicate to token agent 108 that more secure authentication (e.g., an additional authentication event) is needed, and, thus, step-up authentication should be performed.

At step 214, token agent 108 may launch a user interface into which the user may input additional user credentials associated with the additional authentication method. In order to securely transmit the additional user credentials to, and receive a secondary token from, authentication service 120, a protocol such as OAuth (e.g., OAuth 2.0) may be used. At step 216, token agent 108 sends the OTA token as well as a request to authentication service 120 to authenticate with the additional authentication method (e.g., to perform step-up authentication). In some embodiments, the OTA token indicates how token agent's request should be handled after step-up authentication is successfully performed. Then, at step 220, the user interface (e.g., a browser) of token agent 108 is redirected to the appropriate identity provider in order to collect additional user credentials via a secure connection, such as a secure connection established using the OTA token. In some embodiments, at step 220, authentication service 120 redirects the user interface launched at step 214 to a webpage of an identity provider. The user then inputs the additional user credentials via the identity provider's webpage.

Next, at step 222, authentication service 120 and/or the identity provider accesses the record associated with the primary token and determines whether the additional user credentials submitted by the user are valid. If the additional user credentials are valid, then an additional authentication event associated with the additional authentication method may be generated and associated with the primary token. The additional authentication event that is associated with the primary token may include an authentication method and a time at which the authentication was performed. In some embodiments, the authentication event is associated with the primary token by storing the authentication event in the primary token itself. For example, the authentication event (e.g., the authentication method and an authentication timestamp) may be stored in the AuthContext field of a JWT. In the same or other embodiments, the authentication event may be stored in a record (e.g., stored on authentication service 120) that is associated with the primary token, such that the authentication event can be accessed next time the primary token is submitted to authentication service 120.

At step 224, the updated primary token (e.g., including the authentication event associated with the additional user credentials) may be transmitted back to token agent 108. Token agent 108 may then replace its primary token with the updated primary token. Alternatively, if the authentication event is not stored in the primary token itself, step 224 may be omitted.

Next, at step 226, token agent 108 re-submits the request for resources for App1, the primary token, and the optional App1 ID to authentication service 120. At step 228, authentication service 120 reads the alpha-numeric string stored in the primary token and accesses the record associated with the primary token. Authentication service 120 then determines—based on the authentication event stored in the record and/or the authentication event stored in the primary token—that the user has performed the additional authentication method (e.g., the step-up authentication) and, thus, is authorized to access the resources specified in App1's request for resources. A secondary token (e.g., a first secondary token) is then transmitted to token agent 108. In some embodiments, the secondary token issued by authentication service 120 is for use by App1 only. Accordingly, if the secondary token and/or App1 are compromised, access to the requested resources may be revoked for App1 without affecting other applications' 110 access to various resources.

At step 230, token agent 108 passes the first secondary token to App1. At step 232, App1 transmits the first secondary token and the request for resources to resource server $112_1$. Then, at step 234, resource server $112_1$ transmits the requested resources to App1.

Figure 3:
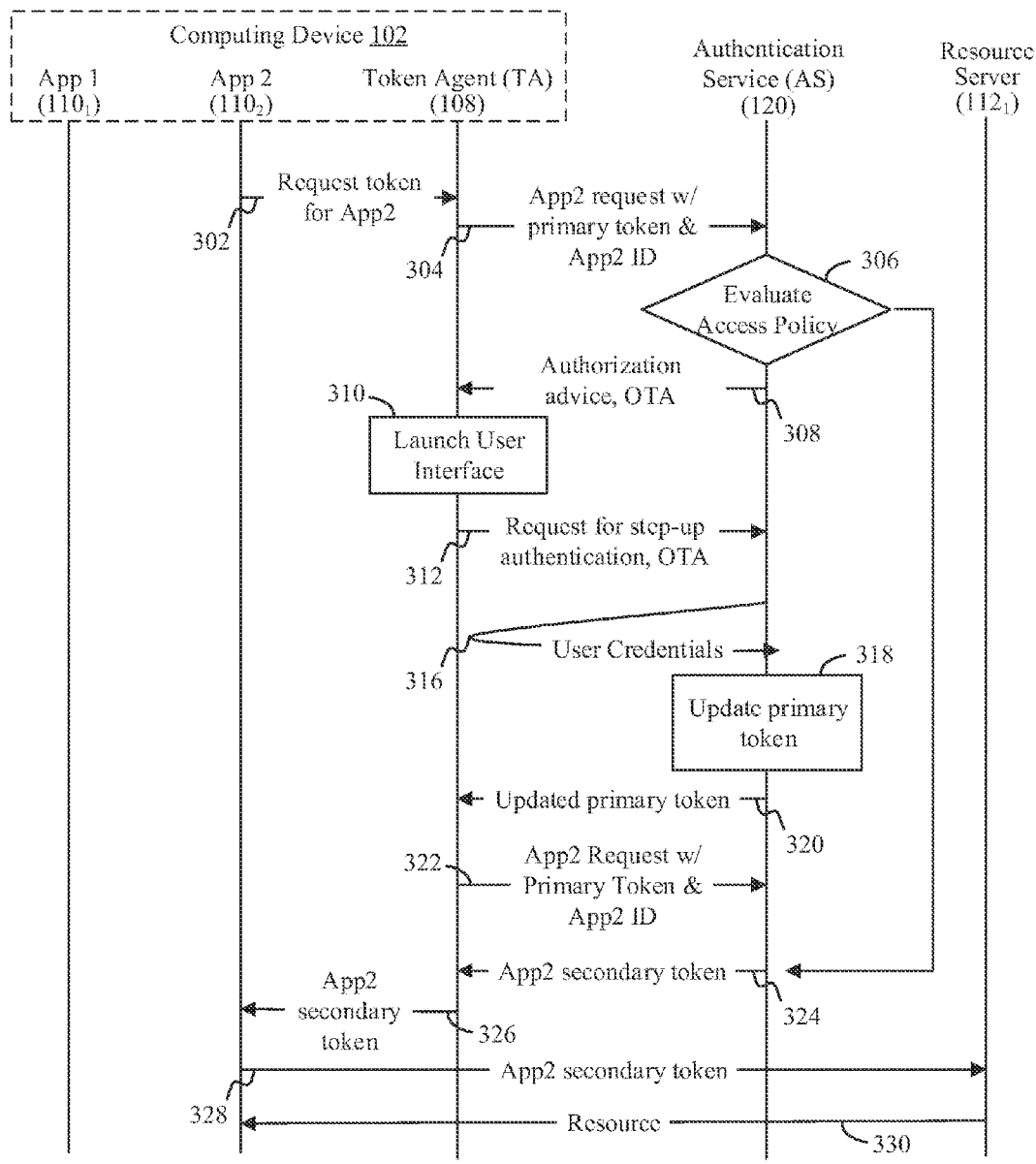
FIG. 3 is a sequence diagram that illustrates example operations for reusing the additional authentication event (e.g., the step-up authentication) described in FIG. 2 with one or more other applications, according to one embodiment.

FIG. 3 is a sequence diagram that illustrates example operations for reusing the additional authentication event (e.g., the step-up authentication) described in FIG. 2 with one or more other applications 110, according to one embodiment. While the example operations are depicted as being performed by the system 100 of FIG. 1, it is contemplated that embodiments may be performed by other suitable systems.

At step 302, application $110_2$ ("App2") requests a token from token agent 108 to access resources stored on resource server $112_1$. In response to the request from App1, at step 304, token agent 108 transmits the request for resources, the primary token, an optional identification (ID) associated with App2 ("App2 ID"), and an optional device ID to authentication service 120. At step 306, authentication service 120 reads the alpha-numeric string stored in the primary token and accesses the record associated with the primary token. Authentication service 120 then evaluates an access policy associated with the record to determine whether the user is authorized to access the resources specified in App2's request for resources.

If the request for resources submitted by App2 specifies the same or similar type(s) of resources that were previously requested by App1 and/or specifies resources that require the same or similar authentication method(s) as the resources that were previously requested by App1, then authentication service 120 may determine that the user is authorized to access the requested resources. The sequence then proceeds to step 324, where authentication service 120 issues a secondary token (e.g., a second secondary token) for App2 to token agent 108. In some embodiments, the secondary token issued for App2 is different than the secondary token issued for App1, enabling authentication service 120 and/or resource server(s) 112 to determine which application 110 is attempting to access resources and revoke such access to a specific application 110, if necessary. At step 326, token agent 108 passes the second secondary token to App2. At step 328, App2 transmits the secondary token and the request for resources to resource service $112_1$, which validates the secondary token. Then, at step 330, resource server $112_1$ transmits the requested resources to App2.

Accordingly, by associating user authentication information, such as when a user authenticated and which authentication method was used, with a primary token stored by token agent 108, the technique described above enables step-up authentication to be performed via SSO. Consequently, user credentials may be inputted once to perform step-up authentication, and the resulting authentication event may be used by multiple applications, increasing user convenience while maintaining secure access to sensitive resources.

Alternatively, if, at step 306, authentication service 120 determines that the user is not authorized to access the resources requested by App2, then the sequence may proceed to step 308, where authentication service 120 replies to token agent 108 with App2 ID, an OTA token, and advice to re-authenticate with yet another authentication method. In some embodiments, yet another authentication method may be required if App2 attempts to access a different type of resources than the resources that were accessed by App1 and/or attempts to access resources from a different resource server 112 (e.g., resource server $112_2$) than was accessed by App1. In response to the advice to re-authenticate, at step 310, token agent 108 may again launch a user interface into which the user may input user credentials associated with yet another authentication method. At step 312, token agent 108 sends the OTA token and a request to authentication service 120 to authenticate with the additional authentication method (e.g., to perform step-up authentication once again).

The request may include App2 ID as well as the authentication advice provided by authentication service 120. At step 316, the user interface of token agent 108 is redirected to the appropriate identity provider in order to collect the user credentials via a secure connection, such as a secure connection established using the OTA token.

Next, at step 318, authentication service 120 and/or the identity provider accesses the record associated with the primary token and determines whether the user credentials submitted by the user are valid. If the user credentials are valid, then another authentication event associated with the additional authentication method may be associated with the primary token (e.g., stored in the primary token itself and/or stored in a record associated with the primary token).

At step 320, the updated primary token (e.g., including the authentication event generated at step 318) may be transmitted to token agent 108. Then, at step 322, token agent 108 re-submits the request for resources for App2, the primary token, and the optional App2 ID to authentication service 120. At step 324, authentication service 120 accesses the record associated with the primary token and determines that the user has performed the required authentication method (e.g., the additional step-up authentication). A secondary token (e.g., a second secondary token) is then transmitted to token agent 108. At step 326, token agent 108 passes the second secondary token App2. At step 328, App2 transmits the first secondary token and the request for resources to resource server 112$_1$ (or, as described above, to resource server 112$_2$). Then, at step 330, resource server 112$_1$ (or resource server 112$_2$) transmits the requested resources to App2.

Although not explicitly shown in FIGS. 2 and 3, one or more additional applications 110 (e.g., application 110$_3$) also may use the authentication events associated with the primary token to access resources using SSO. Additionally, one or more of applications 110 may use the primary token and its associated authentication events to re-authenticate a user session, such as when the session has timed out.

Figure 4:
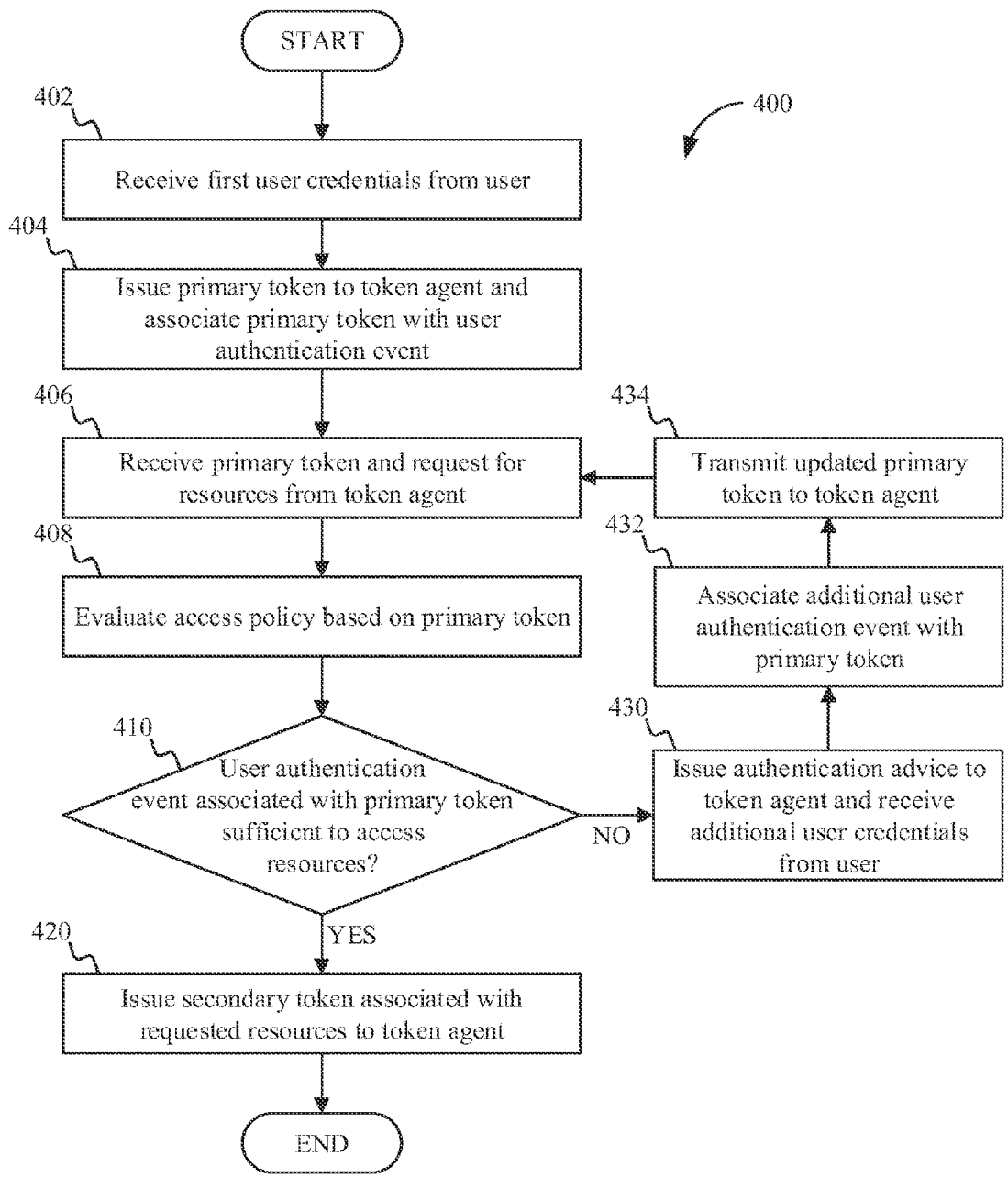
FIG. 4 is a flow diagram of an exemplary method performed by authentication service to authenticate a user.

FIG. 4 is a flow diagram of an exemplary method 400 performed by authentication service 120 to authenticate a user. It should be recognized that, even though the method 400 is described in conjunction with the systems of FIGS. 1-3, any system configured to perform the method steps is within the scope of embodiments of the disclosure.

Method 400 begins at step 402, where authentication service 120 receives user credentials from a user (e.g., via a user interface generated by token agent 108). Authentication service 120 may validate the user credentials based on a record stored in a user directory. At step 404, after validating the user credentials, authentication service 120 associates the initial authentication event with the primary token and issues the primary token to token agent 108, as described above in conjunction with FIG. 2.

At step 406, when an application 110 (e.g., application 110$_1$) executing on computing device 102 requests access to resources, authentication service 120 receives the primary token, the request for resources, an optional App ID (e.g., App1 ID), and an optional device ID from token agent 108. Then, at step 408, authentication service 120 evaluates an access policy associated with the primary token. Based on the access policy, at step 410, authentication service 120 determines whether the authentication event associated with the primary token is sufficient to enable application 110$_1$ to access the requested resources. If the authentication event is sufficient, then, at step 420, authentication service 120 issues a secondary token associated with the requested resources to token agent 108.

If, however, the authentication event is insufficient, then, at step 430, authentication service 120 requests and receives additional user credentials from the user, as described in further detail in steps 212-220 and steps 308-316 of FIGS. 2 and 3, respectively. Once valid additional user credentials are received from the user, at step 432, authentication service 120 associates the additional authentication event with the primary token. Next, at optional step 434, if authentication service 120 stores the additional authentication event associated with the additional user credentials in the primary token, then authentication service 120 may transmit the updated primary token to token agent 108. Alternatively, if the additional authentication event is not stored in the primary token itself, then step 434 may be omitted. Method 400 then returns to step 406, where the primary token is received from token agent 108. At step 408, authentication service 120 evaluates the access policy based on the primary token and, at step 410, determines that the authentication events associated with the primary token are sufficient to access the requested resources. Then, at step 420, authentication service 120 issues a first secondary token to token agent 108. Method 400 then terminates.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. For example, while embodiments herein have referred to certain types of communications services 220 and methods of transmitting messages between users of communications services 220, it should be recognized that other types of communication services 220 and messaging techniques may be utilized in alternative embodiments. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for authenticating a user seeking access to first and second resources that have different authentication levels, comprising:
   receiving, at a token agent installed on a computing device of a user, information authenticating the user, wherein the token agent is not a browser;
   sending, from the token agent to an authentication server, a request for a primary token authorizing access to the first resource, the request including the information authenticating the user;
   receiving the primary token at the token agent, from the authentication server, wherein the token agent associates the primary token with a plurality of applications installed on the computing device;
   receiving, at the token agent, a request to access the second resource from a first application of the plurality of applications installed on the computing device;
   sending, from the token agent to the authentication server, the primary token and the request to access the second resource;
   receiving, at the token agent, instructions from the authentication server to perform a second authentication event;
   in response to receiving instructions from the authentication server to perform a second authentication event, launching a user interface on the computing device through which the user provides authentication information for the second authentication event;
   sending, from the token agent to the authentication server, information associated with the second authentication event;
   receiving, at the token agent, an updated primary token from the authentication server, wherein the token agent associates the updated primary token with more than one of the plurality of applications installed on the computing device;
   resubmitting, from the token agent to the authentication server, the request to access the second resource from the first application, the resubmitted request including the updated primary token; and
   receiving, at the token agent, a secondary token from the authentication server, the secondary token authorizing the first application to access the second resource.

2. The method of claim 1, further comprising:
   receiving, at the token agent, a request to access the second resource from a second application of the plurality of applications installed on the computing device;
   sending, from the token agent to the authentication server, the updated primary token and the request to access the second resource; and
   receiving, at the token agent, an additional secondary token from the authentication server, the additional secondary token authorizing the second application to access the second resource.

3. The method of claim 2, further comprising:
   receiving, at the token agent, a request to access a third resource from a second application of the plurality of applications installed on the computing device;
   sending, from the token agent to the authentication server, the updated primary token and the request to access the third resource; and
   receiving, at the token agent, another secondary token from the authentication server, the another secondary token authorizing the second application to access the third resource.

4. The method of claim 1, wherein the instructions from the authentication server to perform a second authentication event are generated based on a determination by the authentication server that an access policy associated with the primary token does not provide for access to the secondary resource.

5. The method of claim 1, wherein receiving instructions from the authentication server to perform a second authentication event further comprises receiving a one-time access (OTA) token from the authentication server.

6. The method of claim 1, wherein the request to access the second resource from the first application includes a first application identification (ID) that identifies the first application to the authentication server.

7. The method of claim 2, wherein the request to access the second resource from the second application includes a second application identification (ID) that identifies the second application to the authentication server.

8. A non-transitory, computer-readable storage medium comprising instructions that, when executed by a processor of a computing device of a user, performs stages for authenticating a user seeking access to first and second resources having different authentication levels, the stages comprising:
   receiving, at a token agent installed on a computing device of a user, information authenticating the user, wherein the token agent is not a browser;
   sending, from the token agent to an authentication server, a request for a primary token authorizing access to the first resource, the request including the information authenticating the user;
   receiving the primary token at the token agent, from the authentication server, wherein the token agent associates the primary token with a plurality of applications installed on the computing device;
   receiving, at the token agent, a request to access the second resource from a first application of the plurality of applications installed on the computing device;

sending, from the token agent to the authentication server, the primary token and the request to access the second resource;

receiving, at the token agent, instructions from the authentication server to perform a second authentication event;

in response to receiving instructions from the authentication server to perform a second authentication event, launching a user interface on the computing device through which the user provides authentication information for the second authentication event;

sending, from the token agent to the authentication server, information associated with the second authentication event;

receiving, at the token agent, an updated primary token from the authentication server, wherein the token agent associates the updated primary token with more than one of the plurality of applications installed on the computing device;

resubmitting, from the token agent to the authentication server, the request to access the second resource from the first application, the resubmitted request including the updated primary token; and receiving, at the token agent, a secondary token from the authentication server, the secondary token authorizing the first application to access the second resource.

9. The non-transitory, computer-readable storage medium of claim 8, wherein the stages performed by the processor of the computing device further comprise:

receiving, at the token agent, a request to access the second resource from a second application of the plurality of applications installed on the computing device;

sending, from the token agent to the authentication server, the updated primary token and the request to access the second resource; and receiving, at the token agent, an additional secondary token from the authentication server, the additional secondary token authorizing the second application to access the second resource.

10. The non-transitory, computer-readable storage medium of claim 8, wherein the stages performed by the processor of the computing device further comprise:

receiving, at the token agent, a request to access a third resource from a second application of the plurality of applications installed on the computing device;

sending, from the token agent to the authentication server, the updated primary token and the request to access the third resource; and receiving, at the token agent, another secondary token from the authentication server, the another secondary token authorizing the second application to access the third resource.

11. The non-transitory, computer-readable storage medium of claim 8, wherein the instructions from the authentication server to perform a second authentication event are generated based on a determination by the authentication server that an access policy associated with the primary token does not provide for access to the secondary resource.

12. The non-transitory, computer-readable storage medium of claim 8, wherein receiving instructions from the authentication server to perform a second authentication event further comprises receiving a one-time access (OTA) token from the authentication server.

13. The non-transitory, computer-readable storage medium of claim 8, wherein the request to access the second resource from the first application includes a first application identification (ID) that identifies the first application to the authentication server.

14. The non-transitory, computer-readable storage medium of claim 9, wherein the request to access the second resource from the second application includes a second application identification (ID) that identifies the second application to the authentication server.

15. A system for authenticating a user seeking access to first and second resources that have different authentication levels, comprising:

a computing device assigned to a user and having a plurality of applications installed, the computing device comprising a processor and a memory storage; and a token agent installed on the computing device, wherein the token agent operates on the computing device as a background process that receives token requests from the plurality of applications, and wherein the token agent is not a browser;

wherein the processor of the computing device is programmed to carry out stages for authentication of the user, the stages comprising:

receiving information authenticating the user at the token agent;

sending, from the token agent to the authentication server, a request for a primary token authorizing access to the first resource, the request including the information authenticating the user;

receiving the primary token at the token agent, from the authentication server, wherein the token agent associates the primary token with a plurality of applications installed on the computing device;

receiving, at the token agent, a request to access the second resource from a first application of the plurality of applications installed on the computing device;

sending, from the token agent to the authentication server, the primary token and the request to access the second resource;

receiving, at the token agent, instructions from the authentication server to perform a second authentication event;

in response to receiving instructions from the authentication server to perform a second authentication event, launching a user interface on the computing device through which the user provides authentication information for the second authentication event;

sending, from the token agent to the authentication server, information associated with the second authentication event;

receiving, at the token agent, an updated primary token from the authentication server, wherein the token agent associates the updated primary token with more than one of the plurality of applications installed on the computing device;

resubmitting, from the token agent to the authentication server, the request to access the second resource from the first application, the resubmitted request including the updated primary token; and receiving, at the token agent, a secondary token from the authentication server, the secondary token authorizing the first application to access the second resource.

16. The system of claim 15, wherein the processor of the computing device is programmed to carry out additional stages comprising:

receiving, at the token agent, a request to access the second resource from a second application of the plurality of applications installed on the computing device;

sending, from the token agent to the authentication server, the updated primary token and the request to access the second resource; and receiving, at the token agent, an additional secondary token from the authentication server, the additional secondary token authorizing the second application to access the second resource.

17. The system of claim 15, wherein the instructions from the authentication server to perform a second authentication event are generated based on a determination by the authentication server that an access policy associated with the primary token does not provide for access to the secondary resource.

18. The system of claim 15, wherein receiving instructions from the authentication server to perform a second authentication event further comprises receiving a one-time access (OTA) token from the authentication server.

19. The system of claim 15, wherein the request to access the second resource from the first application includes a first application identification (ID) that identifies the first application to the authentication server.

20. The system of claim 16, wherein the request to access the second resource from the second application includes a second application identification (ID) that identifies the second application to the authentication server.

* * * * *